(12) United States Patent
Alizadehranjbar

(10) Patent No.: US 12,433,744 B2
(45) Date of Patent: Oct. 7, 2025

(54) PERCUTANEOUS PROSTHETIC DEVICE FOR REPLACING A MITRAL VALVE

(71) Applicant: The Governors of the University of Alberta, Edmonton (CA)

(72) Inventor: Keysun Alizadehranjbar, Edmonton (CA)

(73) Assignee: The Governors of the University of Alberta (CA)

( * ) Notice: Subject to any disclaimer, the term of this patent is extended or adjusted under 35 U.S.C. 154(b) by 865 days.

(21) Appl. No.: 17/438,106

(22) PCT Filed: Mar. 10, 2020

(86) PCT No.: PCT/CA2020/050318
§ 371 (c)(1),
(2) Date: Sep. 10, 2021

(87) PCT Pub. No.: WO2020/181373
PCT Pub. Date: Sep. 17, 2020

(65) Prior Publication Data
US 2022/0183828 A1   Jun. 16, 2022

Related U.S. Application Data

(60) Provisional application No. 62/817,592, filed on Mar. 13, 2019.

(51) Int. Cl.
*A61F 2/24* (2006.01)
(52) U.S. Cl.
CPC .......... *A61F 2/2418* (2013.01); *A61F 2/2421* (2013.01); *A61F 2210/009* (2013.01); *A61F 2230/0065* (2013.01)

(58) Field of Classification Search
CPC .................. A61F 2/2418; A61F 2/2421; A61F 2210/009; A61F 2230/0065; A61F 2/2451; A61F 2230/001
See application file for complete search history.

(56) References Cited

U.S. PATENT DOCUMENTS

| | | | |
|---|---|---|---|
| 10,195,028 B2 | 2/2019 | Hosmer et al. | |
| 10,842,496 B2* | 11/2020 | Shelton, IV | A61B 17/1204 |
| 2004/0260393 A1* | 12/2004 | Rahdert | A61B 17/0401 623/2.36 |
| 2005/0288781 A1* | 12/2005 | Moaddeb | A61F 2/2448 623/2.37 |
| 2006/0241746 A1 | 10/2006 | Shaoulian et al. | |

(Continued)

FOREIGN PATENT DOCUMENTS

WO   WO 2018/232026 A1   12/2018

*Primary Examiner* — Melanie R Tyson
*Assistant Examiner* — Rachel S Highland
(74) *Attorney, Agent, or Firm* — Kirsten M. Oates; Rodman & Rodman LLP

(57) ABSTRACT

A device for replacing a mitral valve includes a substantially cylindrically-shaped body having a top portion, a bottom portion, and a waist portion disposed therebetween and having ferromagnetic elements arranged circumferentially, and the top portion, waist portion, and bottom portion defining an aperture extending therethrough for allowing blood flow; and a clamping ring formed of a ferromagnetic material and supporting a plurality of ferromagnetic spheres thereon.

12 Claims, 7 Drawing Sheets

(56) References Cited

U.S. PATENT DOCUMENTS

| | | | |
|---|---|---|---|
| 2011/0270016 A1* | 11/2011 | Snow | A61F 5/0033 600/37 |
| 2012/0215303 A1* | 8/2012 | Quadri | A61F 2/2418 623/2.18 |
| 2013/0053874 A1* | 2/2013 | Ekvall | A61B 17/12013 606/157 |
| 2014/0018910 A1 | 1/2014 | Moaddeb et al. | |
| 2014/0358222 A1* | 12/2014 | Gorman, III | A61F 2/2418 623/2.11 |

* cited by examiner

PERCUTANEOUS PROSTHETIC DEVICE FOR REPLACING A MITRAL VALVE

CROSS-REFERENCE TO RELATED APPLICATIONS

This application claims the benefit of U.S. Provisional Patent Application Ser. No. 62/817,592, filed Mar. 13, 2019, the entirety of which is incorporated herein by reference (where permitted).

FIELD OF THE INVENTION

The present invention relates to a percutaneous prosthetic device for replacing a mitral valve, and methods of making and using same.

BACKGROUND OF THE INVENTION

The mitral valve is a valve in the heart that lies between the left atrium and the left ventricle. The mitral valve has two flaps or leaflets that guard the opening of the left ventricle. The opening is surrounded by the mitral valve annulus which is a fibrous ring that is attached to the mitral valve leaflets. The mitral annulus is dynamic in shape throughout the cardiac cycle. The annulus contracts and reduces its surface area during systole to help provide complete closure of the leaflets.

The mitral valve regulates blood flow from the left atrium into the left ventricle. During diastole, the mitral valve opens as a result of increased pressure from the left atrium as it fills with blood. As atrial pressure increases above that of the left ventricle, the mitral valve opens. Opening facilitates the passive flow of blood into the left ventricle. Diastole ends with atrial contraction, which ejects the final 20% of blood (end-diastolic volume) that is transferred from the left atrium to the left ventricle. The mitral valve closes at the end of atrial contraction to prevent the blood from leaking backwards through the valve.

However, there are three types of mitral valve diseases which impact its proper function. Mitral valve stenosis refers to a narrowing of the valve such that an insufficient volume of blood passes from the left atrium into the left ventricle. Mitral valve prolapse is characterized by the displacement of an abnormally thickened mitral valve leaflet into the left atrium during systole. Mitral valve regurgitation refers to a backflow of blood through the mitral valve each time the left ventricle contracts. A leaking mitral valve allows blood to flow in two directions during the contraction. Leakage can increase blood volume and pressure in the area. Severe regurgitation may lead to congestion in the lungs, enlargement of the heart, heart failure, cardiovascular compromise, or death. Infective endocarditis may be a potential complication.

Treatment of mitral valve diseases may involve administration of medications (e.g., antiarrhythmics, anticoagulants, beta blockers, diuretics) or surgical intervention including, but not limited to, balloon valvuloplasty to open up the mitral valve to treat mitral valve stenosis; and surgery to repair the existing mitral valve to restore proper function, or to replace the mitral valve with either a bioprosthetic valve formed from animal tissue (e.g., cow, pig, human cadaver) or a mechanical valve. However, there are advantages and disadvantages to both types of valves. A bioprosthetic valve does not require administration of blood thinning medications to prevent clotting compared to a mechanical valve. A bioprosthetic valve will wear over time and require further mitral valve surgery compared to a mechanical valve which is generally formed of metal and is not subject to wear and tear, and hence lasts longer.

Further, technical considerations are limiting factors in patients requiring mitral valve surgery to repair or replace a defective mitral valve. The mitral valve is a complex structure, making it difficult to repair or replace. Since the mitral valve is subjected to considerable pressure and force during normal functioning, stability of a repaired or replaced valve is of significant concern. Severe calcification of the mitral annulus also renders mitral valve repair difficult and valve replacement hazardous from risk of atrioventricular rupture. Delivery of a replacement mitral valve may also be problematic since open-heart surgery risks damaging the heart tissue, and issues related with cardioplegia apply to open-heart surgery.

Minimally invasive surgery (for example, percutaneous procedures) and transcatheter techniques are rapidly replacing standard surgical techniques. Percutaneous procedures wherein access to inner organs or other tissue is effected or performed through the skin are preferable, as demonstrated by strong patient satisfaction; lower than predicted mortality; shorter hospitalization; faster recovery; suitability for high operative risk patients (e.g., elderly, comorbidities, severe left ventricular dysfunction); use of fewer resources; less expense; and comparable or better efficacy. Transcatheter aortic valve implantation (TAVI) repairs the aortic valve without removing the old, damaged valve by wedging a replacement valve into the aortic valve's place.

However, the structure and function of the mitral valve are far more complex than the aortic valve. This complexity poses many barriers to the development of transcatheter mitral valve therapies: a D-shaped annulus; the lack of a fibrous annular structure; variability of leaflet and subvalvular apparatus anatomy; and proximity to the left ventricular outflow tract, circumflex coronary artery, and coronary sinus. Therefore, there is a need for an improved prosthetic device for replacing a mitral valve that can be deployed using a minimally invasive technique and achieves proper mitral valve function.

SUMMARY OF THE INVENTION

The present invention relates to a percutaneous prosthetic device for replacing a mitral valve, and methods of making and using same.

In one aspect, the invention comprises a device for replacing a mitral valve comprising:
  a substantially cylindrically-shaped body comprising a top portion, a bottom portion, and a waist portion disposed therebetween and having a plurality of ferromagnetic elements arranged circumferentially, and the top portion, waist portion, and bottom portion defining an aperture extending therethrough for allowing blood flow; and
  a clamping ring formed of a ferromagnetic material and supporting a plurality of ferromagnetic spheres thereon.

In one embodiment, the top portion comprises a flange formed of a circumferential row of hooks extending radially outwardly and upwardly. In one embodiment, the waist portion comprises an inwardly narrowed portion. In one embodiment, the bottom portion comprises a flange formed of a circumferential row of fingers extending radially outwardly and downwardly. In one embodiment, the bottom portion is sized to extend beyond the top portion. In one embodiment, the clamping ring comprises a semi-circular ring and a pair of arms.

In one embodiment, the device is formed of a flexible, elastomeric material. In one embodiment, the material comprises stainless steel, nickel titanium, or nickel titanium alloy.

In another aspect, the invention comprises a method of implanting a prosthetic device in a subject's heart to treat, prevent, or ameliorate a disease or disorder in the subject, comprising:

a) positioning the above device in the subject's heart;
b) anchoring the device by seating the top portion and the waist portion within the mitral valve annulus, and allowing the bottom portion to extend below the mitral valve annulus into the left ventricle;
c) positioning the clamping ring within the coronary sinus to encircle the waist portion; and
d) allowing the waist portion comprising the plurality of ferromagnetic elements and the clamping ring supporting the plurality of ferromagnetic spheres to be drawn together magnetically to move the device from an open position allowing blood flow to a closed position preventing backflow of blood.

In one embodiment, the disease or disorder is selected from mitral valve stenosis, mitral valve prolapse, or mitral valve regurgitation. In one embodiment, the device is implanted percutaneously. In one embodiment, the device is implanted percutaneously and transfemorally.

In yet another aspect, the invention comprises use of the above prosthetic device to treat, prevent, or ameliorate a disease or disorder in the subject.

Additional aspects and advantages of the present invention will be apparent in view of the description, which follows. It should be understood, however, that the detailed description and the specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention will now be described by way of an exemplary embodiment with reference to the accompanying simplified, diagrammatic, not-to-scale drawings. In the drawings.

DETAILED DESCRIPTION OF PREFERRED EMBODIMENTS

Before the present invention is described in further detail, it is to be understood that the invention is not limited to the particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges may independently be included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein.

Figure 1:
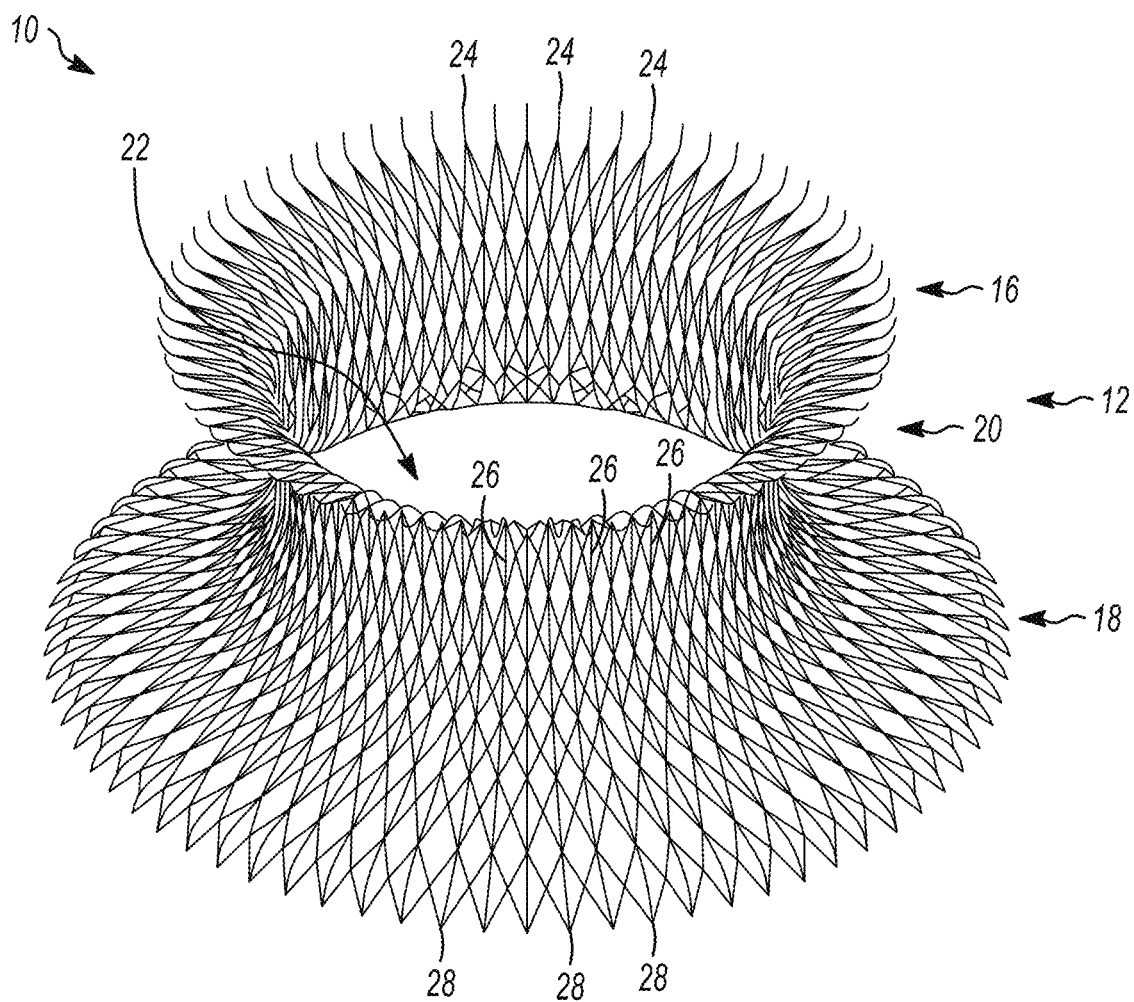
FIG. 1 is a perspective view of one embodiment of a prosthetic device of the present invention, showing the device with the clamping ring removed for clarity, and the device in an open position.
Figure 1:
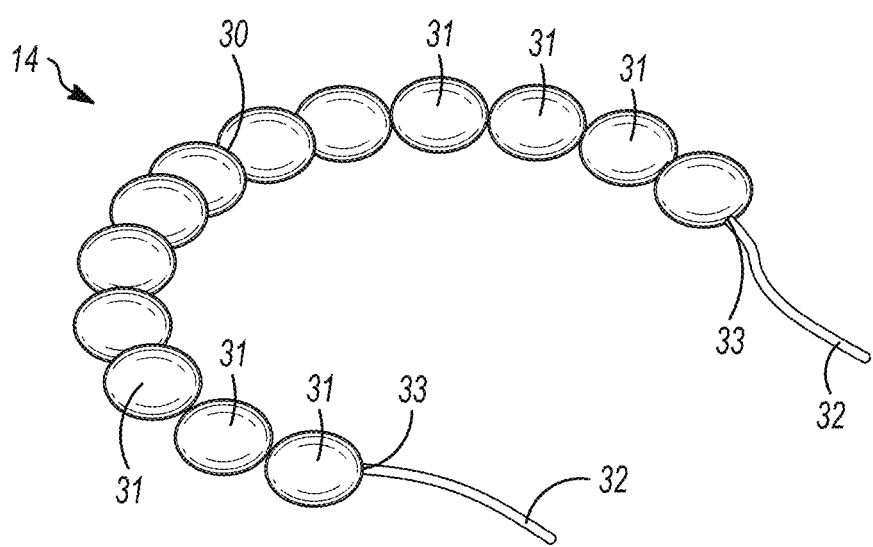
Figure 2:
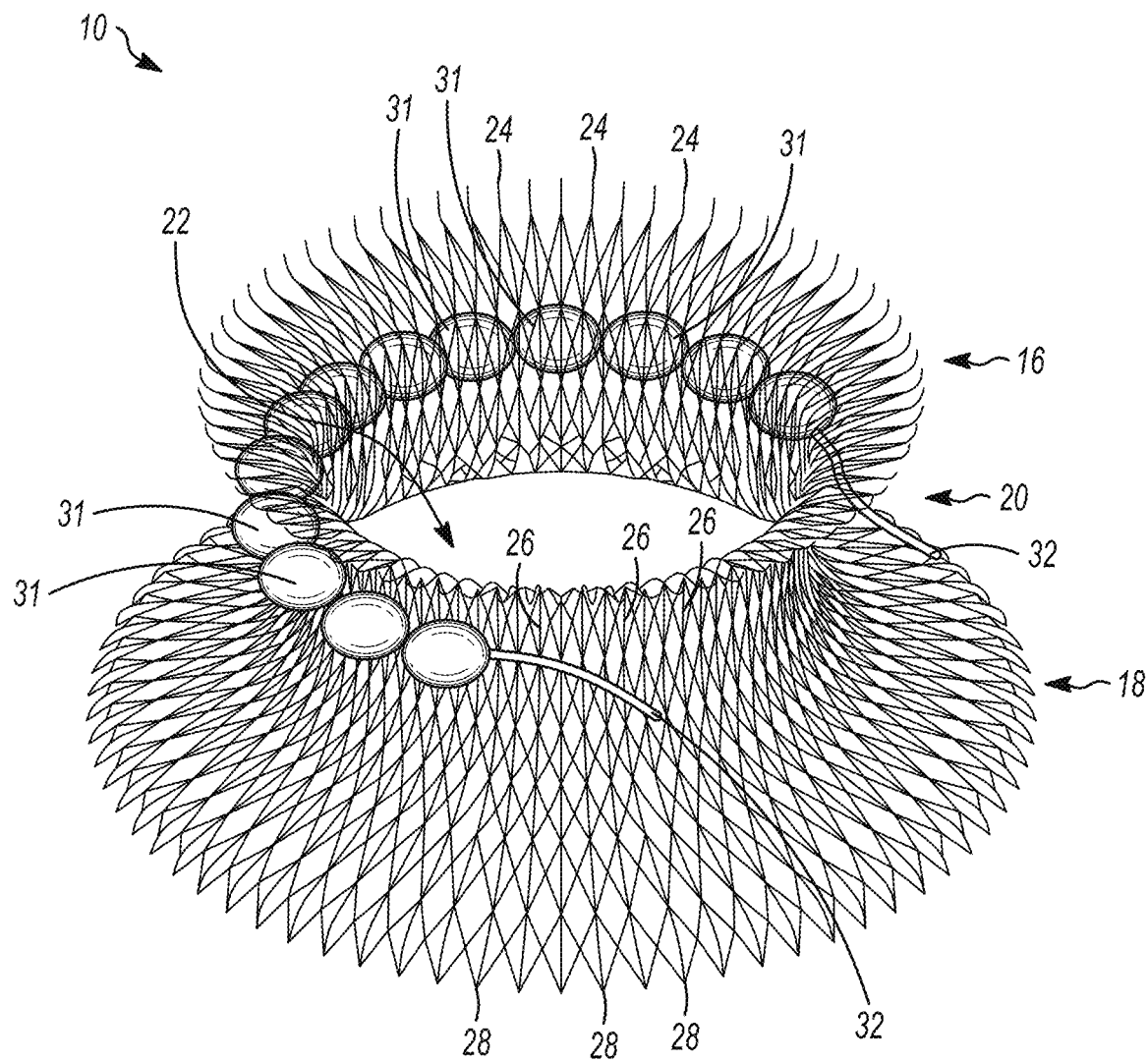
FIG. 2 is a perspective view of one embodiment of a prosthetic device of the present invention, showing the device with the clamping ring encircling the waist portion, and the device in an open position.

The present invention relates to a percutaneous prosthetic device for replacing a mitral valve in a subject, and methods of making and using same. As shown in FIGS. 1 and 2, an exemplary prosthetic device (10) is configured to be inserted into the mitral valve region of a subject's heart so that the device (10) replaces the subject's mitral valve. As used herein, the term "prosthetic device" means an artificial part for a subject's body. In one embodiment, the prosthetic device is in the form of a mitral valve. As used herein, the term "mitral valve" means the native mitral valve or left atrioventricular valve positioned between the left atrium and the left ventricle of the heart of a subject. As used herein, the term "subject" means an animal including a human.

The device (10) comprises a body (12) and a clamping ring (14). The body (12) is substantially cylindrically-shaped comprising three regions along a longitudinal axis of the device (10): a top portion (16), a bottom portion (18), and a narrowing or waist portion (20) disposed therebetween. The top portion (16), waist portion (20), and bottom portion (18) are configured as one piece to together define an aperture (22). The aperture (22) thus extends through the top portion (16), waist portion (20), and bottom portion (18).

The top portion (16) comprises a flange formed of a circumferential row of hooks (24) extending radially outwardly and upwardly.

The waist portion (20) comprises an inwardly narrowed portion between the top portion (16) and the bottom portion (18). In one embodiment, the waist portion (20) includes a plurality of ferromagnetic elements (26). In one embodiment, the ferromagnetic elements (26) are arranged circumferentially. As used herein, the term "ferromagnetic," "ferromagnetic element," or "ferromagnetic material" means a material which exhibits strong magnetic properties, the strength of which depends on that of the applied magnetizing field, and that may persist after removal of the applied field. Suitable ferromagnetic materials include, but are not limited to, iron, nickel, cobalt, gadolinium, dysprosium, and the like.

The bottom portion (18) comprises a flange formed of a circumferential row of fingers (28) extending radially outwardly and downwardly. In one embodiment, the bottom portion (18) is sized to extend beyond the top portion (16).

The clamping ring (14) comprises a semi-circular ring (30) and a pair of arms (32). In one embodiment, the clamping ring (14) is formed of a ferromagnetic material. In one embodiment, the clamping ring (14) supports a plurality of ferromagnetic spheres (31) perforated to define apertures (33) extending therethrough for threading or stringing onto the semi-circular ring (30). The ferromagnetic spheres (31) strengthen the anchoring of the clamping ring (14) around the waist portion (20) of the body (12) by increasing the ferromagnetic forces between the clamping ring (14) and the ferromagnetic elements (26) of the waist portion (20). The mass of ferromagnetic material, and hence the resultant ferromagnetic forces, can be increased by concomitantly increasing the number of ferromagnetic spheres (31) threaded onto the semi-circular ring (30), while also maintaining the overall shape, characteristics, and function of the clamping ring (14). In one embodiment, the clamping ring (14) is formed of a different ferromagnetic material compared to that of one or more of the spheres (31) and the ferromagnetic elements (26).

The dimensions of the device (10) are not essential to the invention and may be increased or decreased as may be required to satisfy any particular design objectives; for example, the device (10) may be made available in a variety of dimensions to correspond with the dimensions of the subject's native mitral valve. The subject's native mitral valve may be measured using well known techniques including, but not limited to, two-dimensional and M-mode echocardiograms. In an adult human, the circumference of the mitral valve annulus ranges from about 8 to about 10 cm, the length of free margin of anterior leaflet ranges from about 5 to about 7 cm, the length of free margin of posterior leaflet ranges from about 7 to about 9 cm, area of anterior leaflet ranges from about 1 to about 3 cm$^2$, and area of posterior leaflet ranges from about 2 to about 4 cm$^2$.

The device (10) may be formed of most any biocompatible material which is flexible and elastic. As used herein, the term "biocompatible" means generating no significant undesirable host response for the intended utility. Most preferably, biocompatible materials are non-toxic for the intended utility. Thus, for human utility, biocompatible is most preferably non-toxic to humans or human tissues. As used herein, the term "flexible" means capable of bending without breaking. In one embodiment, the device (10) comprises flexible, elastomeric materials which can contract or widen. As used herein, the term "elastomer" means a material which exhibits the property of elasticity, namely the ability to deform when a stress is applied and to recover its original form (i.e., length, volume, shape, etc.) spontaneously when the stress is removed. Elastomers typically have a low Young's modulus (i.e., the ratio of tensile stress to tensile strain, expressed in units of pressure), and a high yield strain (i.e., the stress at which a material begins to deform plastically, expressed in units of pressure). Suitable materials include, but are not limited to, stainless steel, nickel titanium, a nickel titanium alloy, and the like. Such materials are durable, lightweight, and are relatively inexpensive.

It will be appreciated that the device (10) of the present invention is so simple but rugged in construction that it can be made at low cost. The device (10) may be easily fabricated. The body (12) of the device (10) is preferably of one-piece construction, and may be formed by any suitable molding process, and the like. As shown in the FIGS. 1 and 2, the body (10) is formed as a single, integral unit combining the top portion (16), waist portion (20), and bottom portion (18). The clamping ring (14) is manufactured separately as a component which is removably attachable to the body (12). The ferromagnetic spheres (31) are manufactured separately as components which are removably threaded or strung onto the clamping ring (14).

Figure 3:
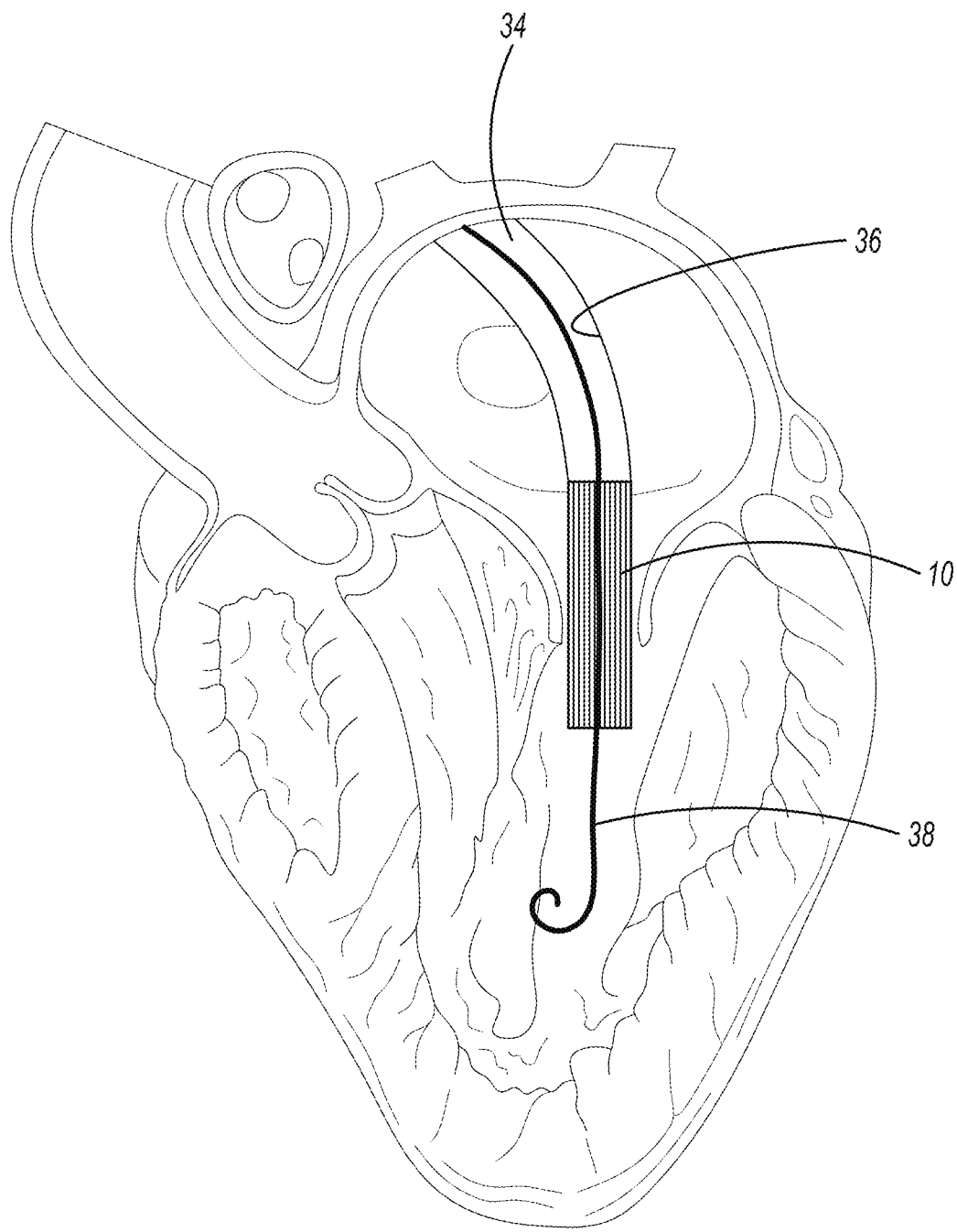
FIG. 3 is a cross-sectional side view of a subject's heart, showing one embodiment of a prosthetic device of the present invention being implanted within the mitral valve region of the subject's heart.
Figure 4:
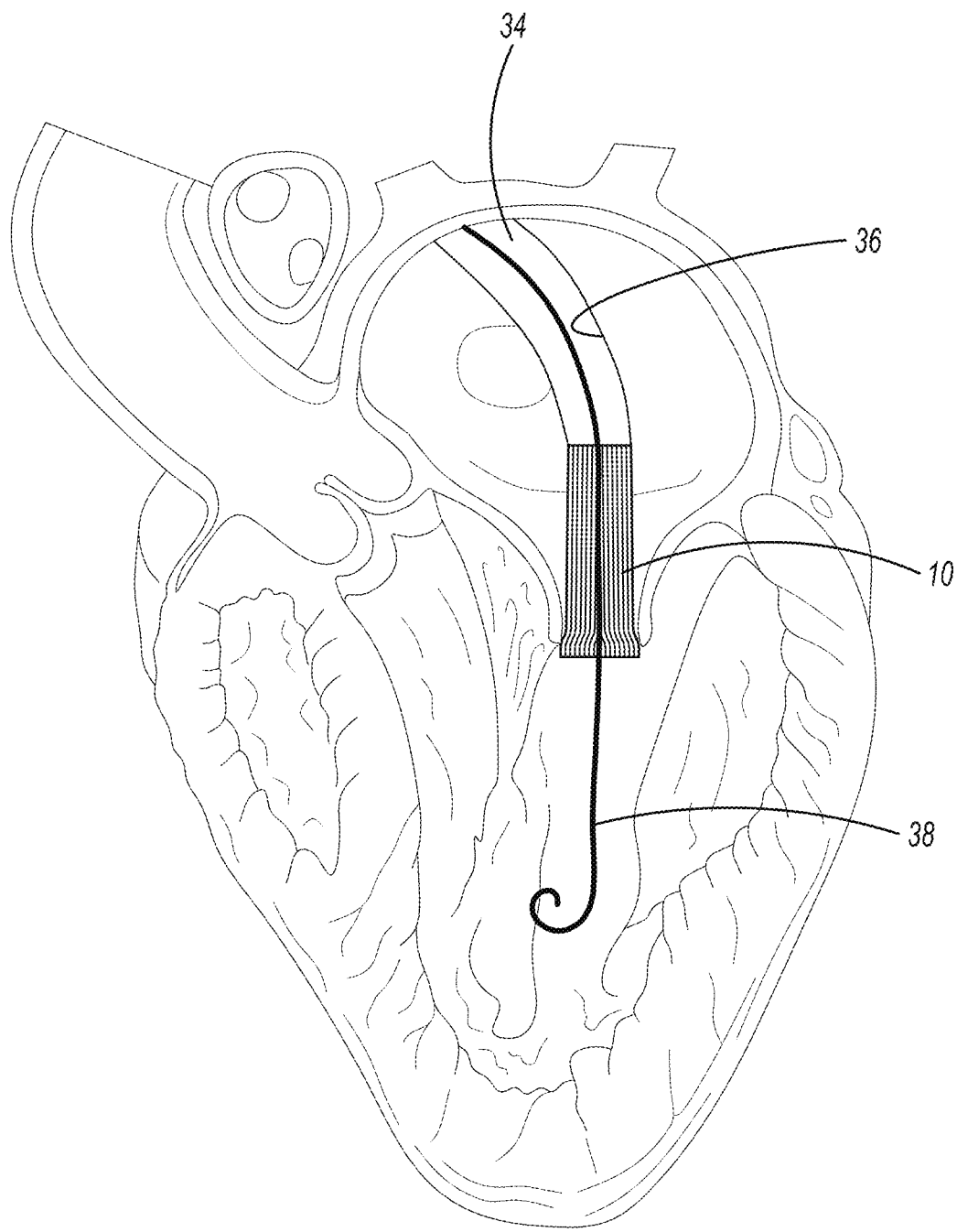
FIG. 4 is a cross-sectional side view of a subject's heart, showing one embodiment of a prosthetic device of the present invention being implanted within the mitral valve region of the subject's heart.
Figure 5:
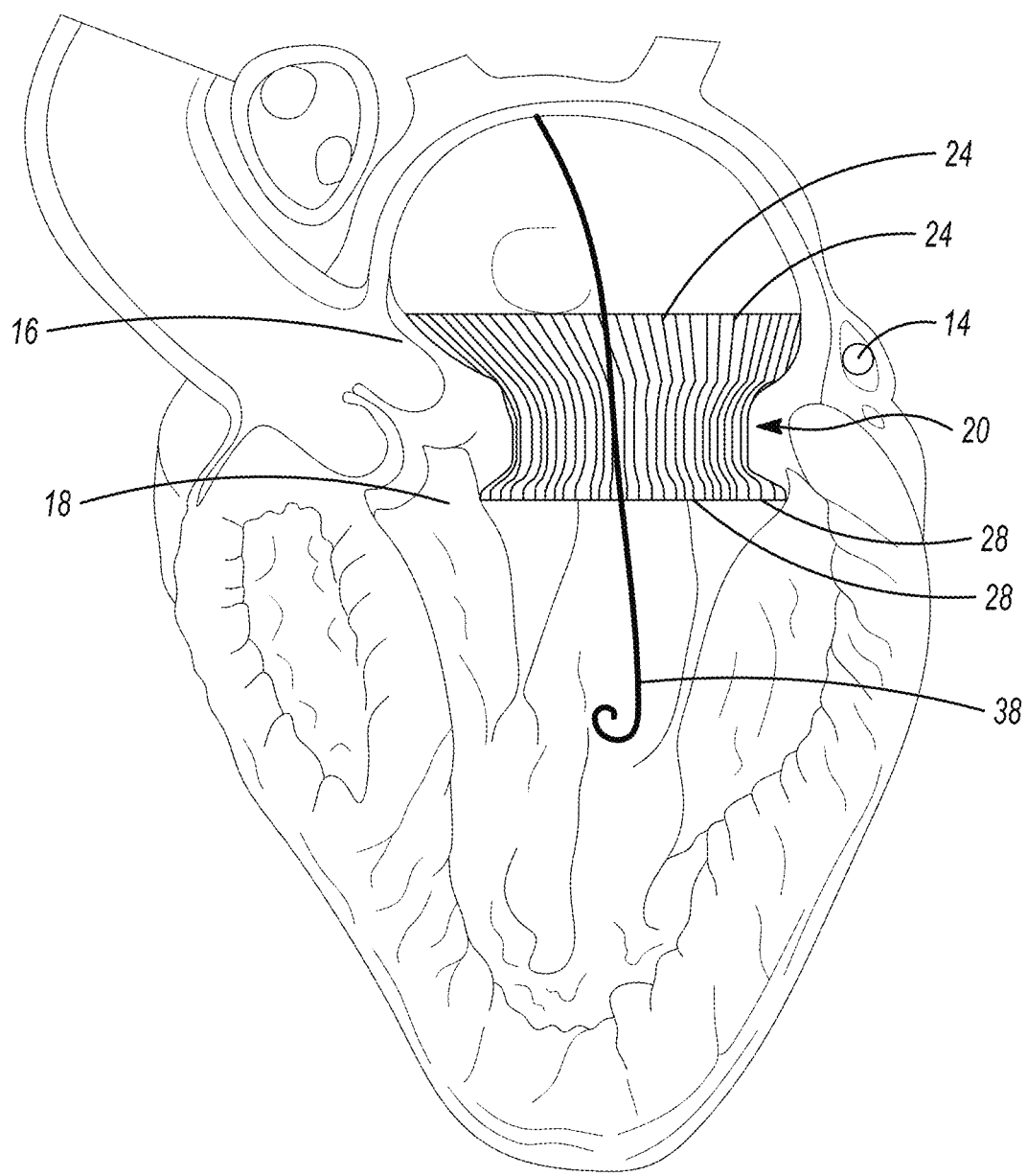
FIG. 5 is a cross-sectional side view of a subject's heart, showing one embodiment of a prosthetic device of the present invention being implanted within the mitral valve region of the subject's heart.
Figure 6A:
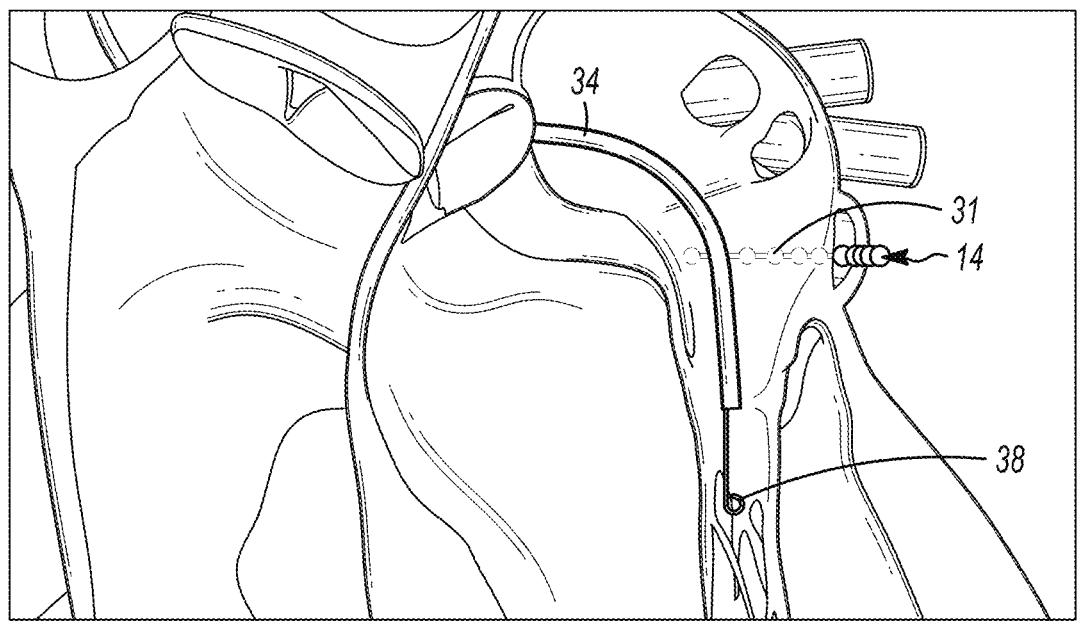
FIGS. 6A, 6B, and 6C are cross-sectional side views of a subject's heart, showing one embodiment of a prosthetic device of the present invention being implanted within the mitral valve region of the subject's heart.
Figure 6B:
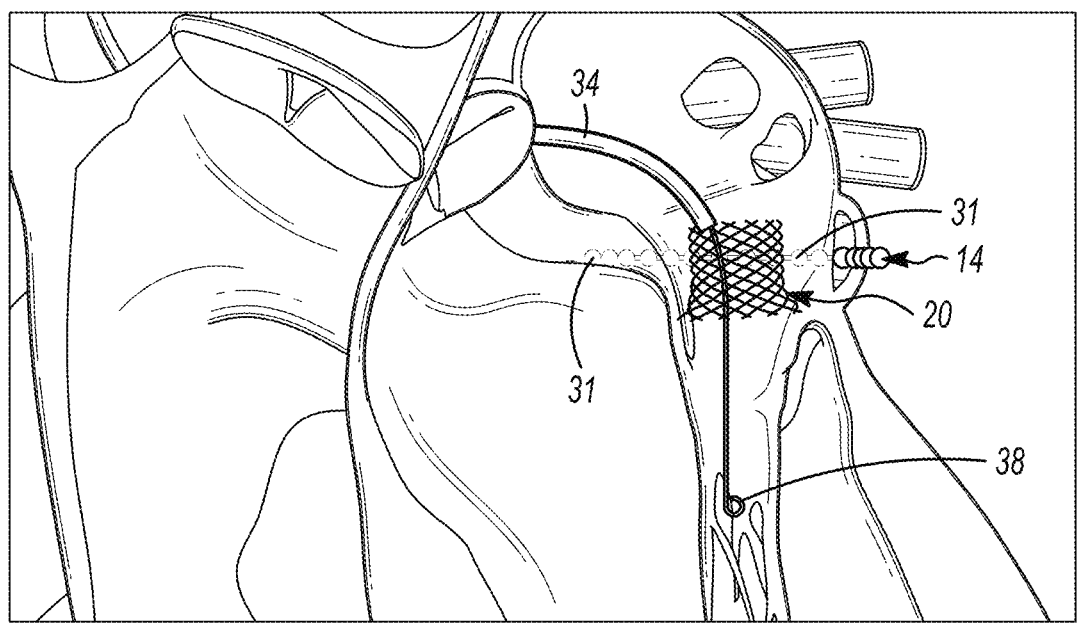
Figure 6C:
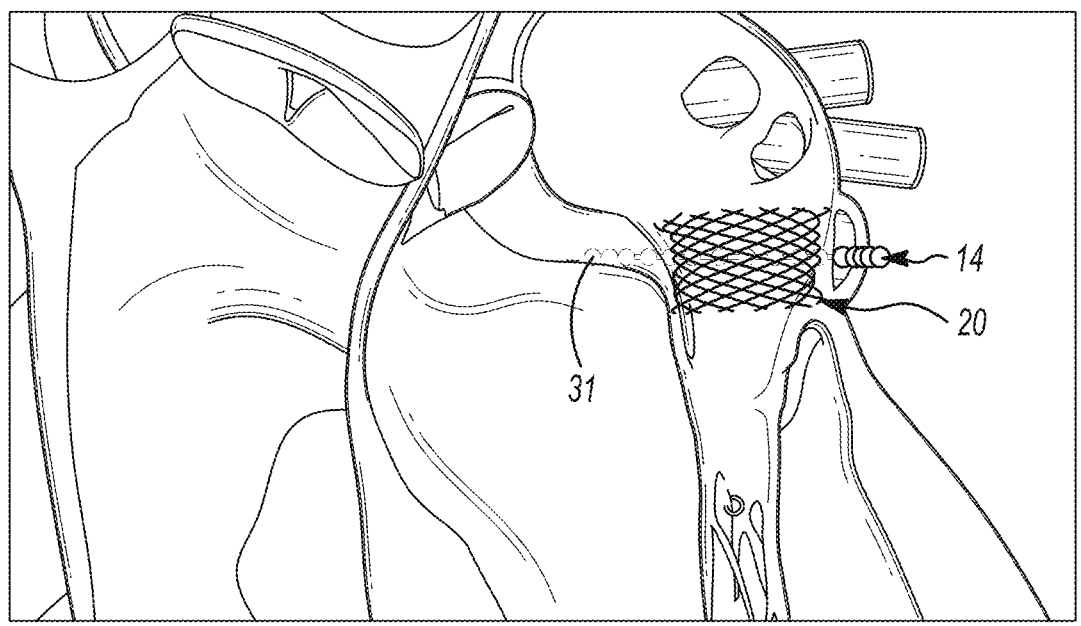

To use the device (10) for mitral valve replacement, the device (10) is implanted into the subject as shown for example, in FIGS. 3-5. In one embodiment, the device (10) is implanted percutaneously. As used herein, the term "percutaneous" or "percutaneously" means effected or performed through the skin of a subject. Suitable delivery approaches for the device (10) include, but are not limited to, transfemorally, transseptally, transatrially, and the like. In one embodiment, the device (10) is implanted using venous access and advanced to the mitral valve region. As used herein, the term "mitral valve region" means the area between the left atrium and left ventricle at which the native mitral valve is positioned.

In one embodiment, the device (10) is implanted percutaneously and transfemorally. The implantation may be performed using medical imaging including, but not limited to, X-ray, fluoroscopy, and the like, in order to provide visual monitoring of the motion and positioning of the device (10) in the subject's body. As shown in FIGS. 3-5 for example, a catheter (34) may be initially inserted into the femoral vein and threaded through the femoral vein and the inferior vena cava into the right atrium. The catheter (34) may pierce the interatrial septum to cross from the right atrium into the left atrium. Other suitable approaches may be used such as, for example, the catheter (34) may be threaded through a left pulmonary vein as shown in FIGS. 3-5. The catheter (34) has a lumen (36) to receive the device (10) in an "undeployed" position, and a guide wire (38) to lead the device (10) into the desired position (FIGS. 3 and 4). The device (10) is inserted into the lumen (36) of the catheter (34) and is threaded within the lumen (36) of the catheter (34) to pass through the femoral vein, inferior vena cava, right atrium, and interatrial septum to reach the left atrium, or alternatively to pass through a pulmonary vein to reach the left atrium. The device (10) moves from the "undeployed" position (FIGS. 3 and 4) to a "deployed" position (FIG. 5) as it is deployed from the catheter (34) into its final position between the left atrium and the left ventricle within the mitral valve region, thereby replacing the native mitral valve. Once the device (10) has been properly positioned, the catheter (34) is retracted from the subject's body.

FIG. 5 shows the position of the device (10) within the mitral valve region. The device (10) is stably anchored by having the top portion (16) and waist portion (20) seated within the mitral valve annulus which surrounds the opening of the left ventricle. The hooks (24) of the top portion (16) extend radially outwardly and upwardly to prevent the device (10) from falling through the opening of the left ventricle. The clamping ring (14) also facilitates stable anchoring of the device (10). The clamping ring (14) is fixed within the coronary sinus of the heart adjacent to the mitral valve annulus. The semi-circular ring (30) with the ferromagnetic spheres (31) and arms (32) substantially encircle the waist portion (20) above the opening of the left ventricle.

The device (10) and the clamping ring (14) are preferably self-deploying upon release in the left atrium and coronary sinus respectively, or may be deployable after placement.

The bottom portion (18) extends below the mitral valve annulus into the left ventricle. The fingers (28) of the bottom portion (18) extend radially outwardly and downwardly below the mitral valve annulus to prevent the device (10) from being dislodged upwardly.

The ferromagnetic elements (26) of the waist portion (20) and the ferromagnetic clamping ring (14) with the ferromagnetic spheres (31) are drawn together magnetically to force the waist portion (20) to contract such that the device (10) is forced into a closed position. When the device (10) is in the closed position, blood is blocked from flowing from the left atrium into the left ventricle.

During diastole, blood fills the left atrium. The increased pressure from blood filling the left atrium forces the device (10) from its closed position wherein the waist portion (20) is contracted, to the open position wherein the ferromagnetic elements (26) and clamping ring (14) with the ferromagnetic spheres (31) are forced apart to allow the waist portion (20) to expand. In the open position (FIG. 2), blood flows from the left atrium and downwardly through the top portion (16), the waist portion (20), and the bottom portion (18) into the left ventricle. Diastole ends with atrial contraction, which ejects the final 20% of blood that is transferred from the left atrium to the left ventricle. The decrease in pressure at the end of atrial contraction causes the device (10) to return to the closed position, thereby preventing the blood from leaking backwards through the device (10). The ferromagnetic elements (26) of the waist portion (20) and the clamping ring (14) with the ferromagnetic spheres (31) are again drawn together magnetically to force the waist portion (20) to contract such that the device (10) returns back to the closed position, preventing backflow of blood from the left ventricle to the left atrium.

Once implanted in the mitral valve region as described above, the device (10) effectively replaces the subject's native mitral valve to treat various diseases or disorders in which restoration of proper native mitral valve function is required. In one embodiment, the invention provides a method of treating, preventing, or ameliorating a disease or disorder in a subject, comprising implanting the device into the subject. As used herein, the term "disease" or "disorder" is meant to include mitral valve diseases or disorders including, but not limited to, mitral valve stenosis, mitral valve prolapse, and mitral valve regurgitation. As used herein, the terms "treating," "preventing" and "ameliorating" refer to interventions performed with the intention of alleviating the symptoms associated with, preventing the development of, or altering the pathology of a disease, disorder or condition. Thus, in various embodiments, the terms may include the prevention (prophylaxis), moderation, reduction, or curing of a disease, disorder or condition at various stages. In various embodiments, therefore, those in need of therapy/treatment may include those already having the disease, disorder or condition and/or those prone to, or at risk of developing, the disease, disorder or condition and/or those in whom the disease, disorder or condition is to be prevented.

While particular embodiments of the present invention have been shown and described, modifications may be made, and it is therefore intended in the appended claims to cover all such changes and modifications which fall within the scope of the invention as defined by the appended claims.

What is claimed is:

1. A device for replacing a mitral valve comprising:
   a substantially cylindrically-shaped body comprising a top portion, a bottom portion, and a waist portion disposed therebetween and having a plurality of ferromagnetic elements arranged circumferentially, the top portion and waist portion seatable within an annulus of the mitral valve and the bottom portion extendable below the annulus into a left ventricle, the body implantable percutaneously without surgical sutures or anchors, and the top portion, waist portion, and bottom portion defining an aperture extending therethrough for allowing blood flow; and
   a separate clamping ring formed of a ferromagnetic material and comprising a pair of arms and a semi-circular ring supporting a plurality of perforated ferromagnetic spheres threaded thereon, the clamping ring being of sufficient length to be extendable through a coronary sinus and encircle the body from outside the annulus;
   the clamping ring, the ferromagnetic spheres, and the ferromagnetic elements being attractable magnetically (i) to shape and stably anchor the body within the annulus (ii) to prevent dislodgement of the body upwardly into the left atrium due to increased pressure during diastole, and (iii) to block backflow of blood from the left ventricle through the aperture into the left atrium during systole.

2. The device of claim 1, wherein the top portion comprises a flange formed of a circumferential row of hooks extending radially outwardly and upwardly.

3. The device of claim 2, wherein the waist portion comprises an inwardly narrowed portion.

4. The device of claim 3, wherein the bottom portion comprises a flange formed of a circumferential row of fingers extending radially outwardly and downwardly.

5. The device of claim 4, wherein the bottom portion is sized to extend beyond the top portion.

6. The device of claim 5, wherein the device is formed of a flexible, elastomeric material.

7. The device of claim 6, wherein the flexible, elastomeric material comprises stainless steel, nickel titanium, or nickel titanium alloy.

8. A method of implanting a prosthetic device in a subject's heart to treat, prevent, or ameliorate a disease or disorder in the subject, comprising:
   a) positioning the device of claim 1 in the subject's heart;
   b) anchoring the device by seating the top portion and the waist portion within the mitral valve annulus, and allowing the bottom portion to extend below the mitral valve annulus into the left ventricle;
   c) positioning the clamping ring within the coronary sinus to encircle the waist portion; and
   d) allowing the waist portion comprising the plurality of ferromagnetic elements and the clamping ring supporting the plurality of ferromagnetic spheres to be drawn together magnetically to move the device from an open position allowing blood flow to a closed position preventing backflow of blood.

9. The method of claim 8, wherein the disease or disorder is selected from mitral valve stenosis, mitral valve prolapse, or mitral valve regurgitation.

10. The method of claim 8, wherein the device is implanted percutaneously.

11. The method of claim 8, wherein the device is implanted percutaneously and transfemorally.

12. Use of the prosthetic device of claim 1 to treat, prevent, or ameliorate a disease or disorder in a subject.

* * * * *